Figure 1:
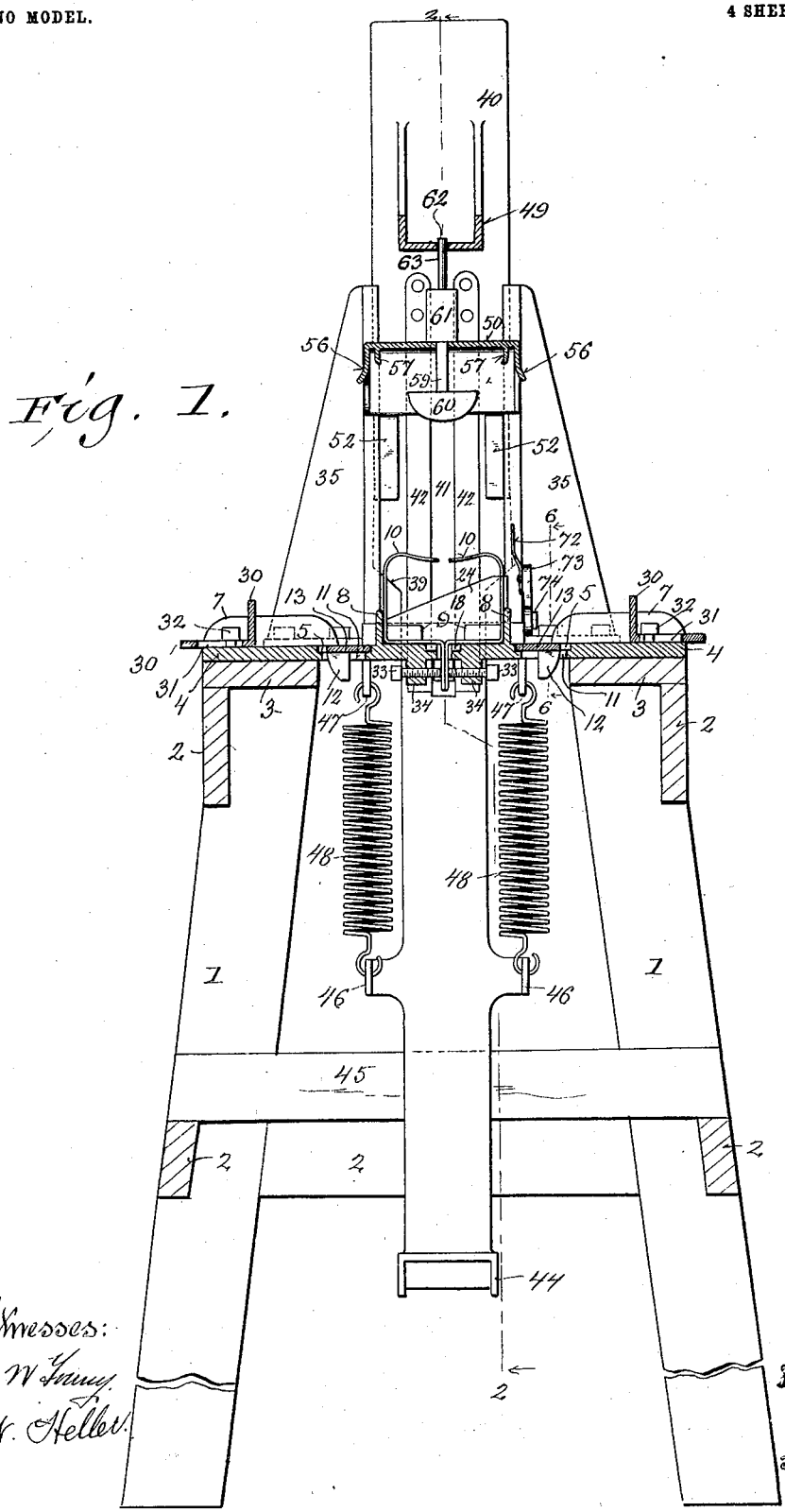

No. 732,668. PATENTED JUNE 30, 1903.
F. M. WADE.
BOX MAKING MACHINE.
APPLICATION FILED APR. 30, 1903.
NO MODEL. 4 SHEETS—SHEET 1.

Witnesses:
Geo W Finny
E. W. Heller

Inventor
Frank M. Wade
By H.G. Underwood
Attorney

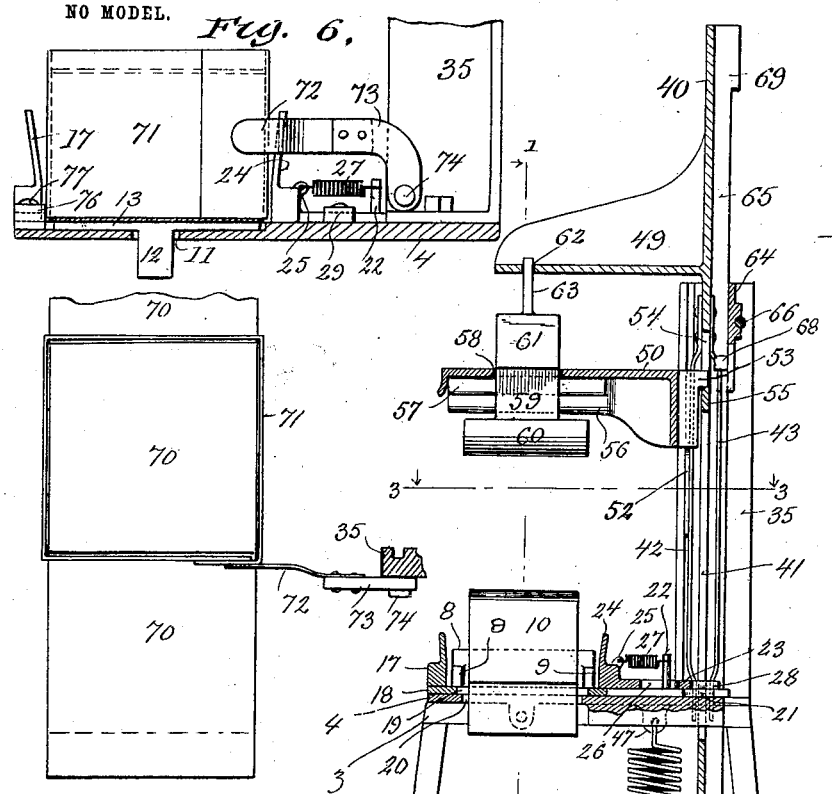

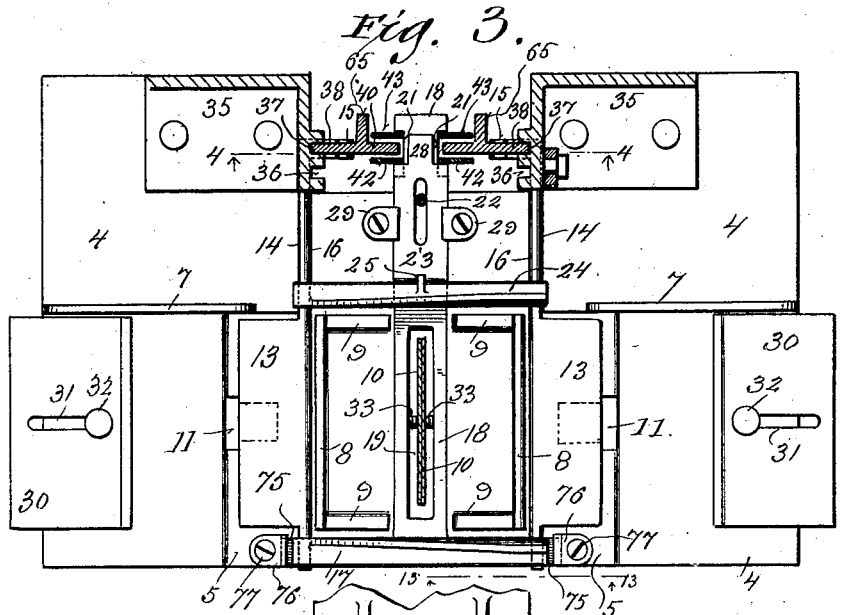
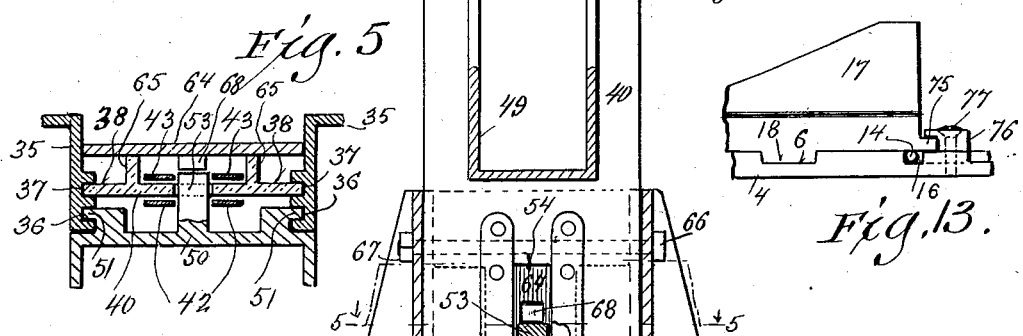
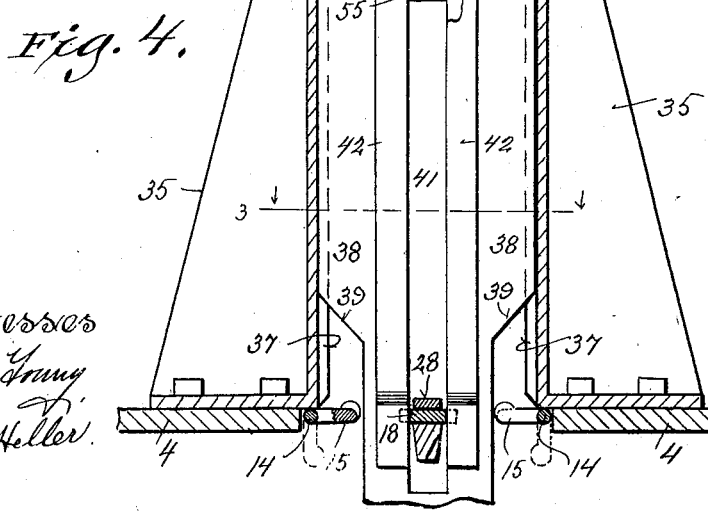

No. 732,668. PATENTED JUNE 30, 1903.
F. M. WADE.
BOX MAKING MACHINE.
APPLICATION FILED APR. 30, 1903.
NO MODEL. 4 SHEETS—SHEET 4.
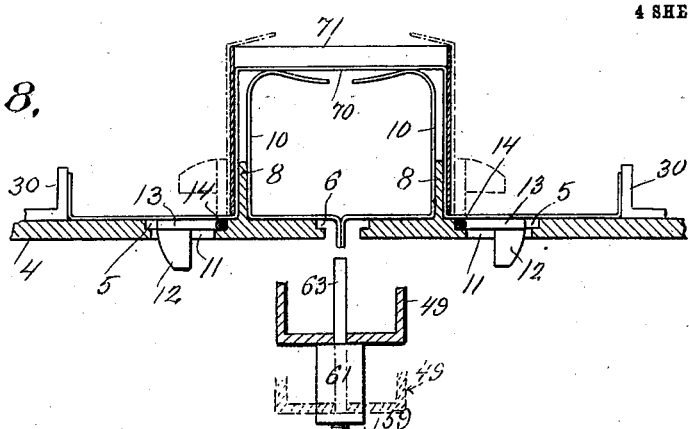

No. 732,668. Patented June 30, 1903.

UNITED STATES PATENT OFFICE.

FRANK M. WADE, OF MILWAUKEE, WISCONSIN, ASSIGNOR OF ONE-FOURTH TO CORNELIUS WHEELER, OF NATIONAL HOME, WISCONSIN.

BOX-MAKING MACHINE.

SPECIFICATION forming part of Letters Patent No. 732,668, dated June 30, 1903.

Application filed April 30, 1903. Serial No. 154,971. (No model.)

*To all whom it may concern:*

Be it known that I, FRANK M. WADE, a citizen of the United States, and a resident of Milwaukee, in the county of Milwaukee and State of Wisconsin, have invented certain new and useful Improvements in Box-Making Machines; and I do hereby declare that the following is a full, clear, and exact description thereof.

My invention has especial reference to machines for making boxes from wood-veneer strips; and it consists in certain peculiarities of construction and combination of parts, as will be fully set forth hereinafter in connection with the accompanying drawings and subsequently claimed.

In the said drawings, Figure 1 is a vertical sectional view of a machine embodying the present invention, taken on the plane indicated by the line 1 1 in Fig. 2. Fig. 2 is a similar view taken on the plane indicated by the line 2 2 in Fig. 1. Fig. 3 is a view of the operative parts of said machine, partly in plan, with the rear portion partly in section, on the plane indicated by the line 3 3 in Figs. 2 and 4 and with the springs secured to the bed-plate, also in section, to better illustrate certain details of construction. Fig. 4 is a detail vertical sectional view taken on the plane indicated by the line 4 4 in Fig. 3. Fig. 5 is a detail horizontal sectional view taken on the plane indicated by the line 5 5 in Fig. 4. Fig. 6 is a detail view, partly in section, on the plane indicated by the line 6 6 in Fig. 1, but showing the box-forming strips in position and with the spring-tongue-holding device down in operative position. Fig. 7 is a detail plan view showing the said box-forming strips and spring-tongue in the same position as in Fig. 6. Figs. 8 and 9 are partly sectional detail views illustrating the operation of the machine. Fig. 10 is a partly-sectional view of the completed box. Figs. 11 and 12 are perspective views of the two strips from which the box is formed, shown bent and folded in position to be applied to the machine. Fig. 13 is a detail front elevation of a part of said machine looking in the direction and at the parts indicated by the arrows and line 13 13 of Fig. 3. Fig. 14 is a detail perspective view of the rear end of one of the folding-flap axial rods.

My said machine is particularly designed for the manufacture of boxes, such as are illustrated in my application for Letters Patent filed August 6, 1902, under Serial No. 118,586, although not necessarily confined thereto, and while of especial value in making boxes, such as fruit and berry boxes, from strips of wood veneer can be used with any suitable thin material which has first been scored or indented, so as to fold upon predetermined lines.

Referring by numerals to the said drawings, 1 1 represent the legs of the supporting-frame suitably braced, as shown at 2 2, and resting on each side on the tops of the legs 1 and upper braces 2 are supporting-boards 3 3 for the base-plate 4, formed with transverse recesses 5 5 and 6, as shown. The central recess 6 extends all the way back through the upper surface of said plate 4; but the recesses 5 5 extend only part way back, to the line of the longitudinally-arranged vertical guide-strips 7 7. The center of the plate 4 is formed with transverse vertical projections 8 8 just inside the lines of the recesses 5 5, having inwardly-extending extensions 9 9 at each end, which are of less height than the projections 8 and extend toward each other to the edges of the central recess 6, thus forming a casing, within which are located the springs 10 10, hereinafter more particularly described. The plate 4 is perforated with longitudinal slots 11 11, which extend through from the center of the recesses 5 5 to receive the lugs 12 12 on the bottom of the flaps 13 13, which are adapted when down to rest in said recesses 5 5, the said flaps extending from rods 14 14, journaled in transverse grooves 16 16 in the upper surface of the plate 4 just outside the lines of the transverse projections 8 8. The rear of this plate is centrally cut out, and the rods 14 14 extend backward beyond the longitudinal edge of the cut-out portion and terminate in inturned ends 15 15, formed with lips to constitute a groove between them, as best shown in Fig. 14. The front end of one of these rods 14, resting in its groove 16, is shown in Fig. 13, which also shows the front upright plate 17 of a transverse slide 18, said plate 17 having end extensions 75 75, extending over the said front ends of the rods 14 14 and held by guide-lips 76 76, secured by screws 77 77 to the base-plate 4, as best shown in Figs. 3 and 13. The transverse slide 18 has movement in the described central recess 6 of the plate 4, said slide 18 having a slot 19 therethrough in line with a transverse slot 20 through the plate 4 at the center of the said recess 6. The rear end of the said slide 18 is cut out on each side, as shown at 21 21, forward of which said slide carries a vertical pin 22, and the upper edge of the front upright plate 17 is beveled or inclined upwardly from the left end to the right end, as best shown in Fig. 13.

Located on the rear part of the slide 18 is another slide 23, having a transverse beveled front upright plate 24 with lug 25, and the slide 23 has a slot 26 therethrough, through which the pin 22 of the slide 18 projects, said pin being connected by spring 27 with the said lug 25, while the rear end of the slide 23 is reduced in width, as shown at 28, and there being ears 29 29 on the plate 4 to serve as guides for the limited movement of the said upper slide 23.

30 30 represent angle-shaped guides formed with slots 31 31 through their horizontal flanges, through which pass the shanks of the set-screws 32 32 into the base-plate 4, on which the said guides have movement toward or from the center, being secured the desired distance therefrom by said set-screws 32 when adjusted to form the required size of box, as hereinafter described. The hereinbefore-named springs 10 10 are of the shape best shown in Fig. 1, each spring having an upright side with inwardly-curved top and a horizontal bottom portion terminating in a downwardly-extending vertical flange, all in one piece, the side portions of the springs bearing against the plate projections 8 8, the bottom portions resting on said plate 4 at the center thereof, and the downward flanges projecting through the slot 19 in the slide 18 and the corresponding slot 20 in the said plate, and the springs being held firmly in place with their downward flanges clamped closely together, as by set-screws 33 33, passing through threaded bores in lugs 34 34 on the under side of said plate 4.

35 35 represent two uprights, preferably of cast metal, secured to and rising from the base-plate 4 at each side of the described rear cut-out portion. The opposed inner faces of these uprights are formed with two pairs of opposed grooves 36 36 and 37 37, and the last-named pair of grooves form guideways for the side flanges 38 38 of a vertical sliding bar 40, said flanges being beveled, as shown at 39 39, at their lower ends and said bar having a central longitudinal slot 41, through which project the rear end of the slide 18 and the superimposed rear end 28 of the slide 23.

Two pairs of vertical outwardly-bent leaf-springs are secured at their upper ends to the bar 40, one spring on each side of said slot, the front springs being marked 42 42 and the rear springs being designated 43 43. The lower end of the sliding bar 40 terminates in a foot-tread 44, and as all of said bar below the base-plate 4 is loose it is guided in its movement by the beam 45, so that it cannot be pushed backward out of line, and above its lower end said bar 40 has a pair of ears 46 46, from which stout spiral springs 48 48 extend to lugs 47 47 on the under side of the base-plate 4.

49 designates a stationary bracket projecting forward from the upper part of the sliding bar 40, and 50 indicates a movable head having vertical movement below said bracket. This head has downward-extending flanges all around and at the rear guide-flanges 51 51, which (together with their vertical downward continuations 52 52) move in the opposed pair of grooves 36 36 in the described uprights 35 35 in front of the bar 40 and is further formed with a rear lug 53, which projects within an upper slot 54, separated by a cross-piece 55 from the main slot 41, said lug normally resting on said cross-piece 55. The outer side flanges 56 56 of the head are curved outwardly at their lower edges, and the inner side flanges 57 57, which extend in parallel lines to the outer flanges, but to only about half their depth, are curved inwardly on their lower edges. The top of the head 50 is a flat shelf, with a slot 58 therethrough to admit the thin flat shank 59 of the plunger 60, this shank being expanded into a block 61, resting on the shelf-top of the head 50, and in practice the said flat shank (in form like a vertical plate) is slipped through the slot 58, and then the plunger is riveted or otherwise secured to the lower end of the said shank. The bracket 49 has a hole 62 therethrough, and a guide-pin 63 is slipped through said hole and screwed or otherwise fastened to the block 61, so that the flat shank 59 has movement through the slot 58 of the head 50 and the guide-pin 63 movement through the hole 62 of the bracket 49 when necessary.

The uprights 35 35 are connected together at the top as follows: A plate 64 is placed against the vertical rear flanges 65 of the bar 40 between the opposed inner sides of said uprights and a bolt 66 slipped through openings in said uprights and within a horizontal groove in the rear face of said plate and a nut 67 screwed on the projecting end of said bolt, thus holding the uprights 35 35 firmly together at the top, and yet permitting the bar 40 to be freely moved in front of the plate 64, which latter has a lug 68 on its front face (back of the line of the end of the rear lug 53 of the head 50) which may bear against the upper rear face of the bar 40, midway between the rear flanges 65 of the latter when the bar is in motion, the upper ends of said flanges being extended backward and shouldered, as shown at 69, the upper edge of this plate 64 thus serving as a stop to limit the downward movement of the bar when the shouldered flange extensions 69 come in contact with said plate, this limit of movement being made adjustable, as the plate 64 can be reversed, and fastened, as before, by the bolt 66, as then the downward movement of the bar 40 will be increased, the described horizontal groove in the rear face of the plate being placed at some distance from the center, this adjustment being for the purpose of adapting the machine to the manufacture of boxes of different heights.

As heretofore stated, the boxes to be made are of the general class named in my prior application for patent, and my machine as organized is especially intended for the manufacture of such boxes from two strips of veneer or like material bent and folded as shown in Figs. 11 and 12. The strip 70, Fig. 12, is first placed in position, as shown in Fig. 8, on the base-plate 4 over the springs 10 10, with the extreme upturned ends of the strip against the vertical flanges of the angle-shaped guides 30 30 and with the central vertical side portions of said strip against the outer sides of the plate projections 8 8 and the central horizontal portion of the said strip over and resting on the curved inner ends of the springs 10 10, all as shown in said Fig. 8. Next the strip 71, bent and folded as shown in Fig. 11, is slipped over the central portion of the strip 70, with the front part of said strip 71 between the front upright plate 17 of the transverse slide 18 and the adjacent extensions 9 9 of the plate projections 8 8 and with the rear part of said strip 71 between the upright plate 24 of the slide 23 and the rear extensions 9 9 of the plate projections 8 8, adjacent to said plate 24, while the side or end portions of said strip 71 are against the central side portions of the strip 70, but rising to a higher plane, and if the strip 71 is not interlocked the loose ends may be held tightly together by the spring-tongue 72, secured to the curved arm 73, attached by a pivot 74 to the adjacent upright 35, as best shown in Figs. 6 and 7. The strips for forming the box being in the positions shown in full lines in Fig. 8, downward pressure is applied to the foot-tread 44 of the vertical sliding bar 40, which first results by reason of the pressure of the outwardly-bent vertical rear springs 43 43 against the recessed end of slide 18 and the like action of the similar front springs 42 42 against the recessed end of the slide 23 as said springs are drawn down with the bar 40 in drawing the upright plates 17 and 24 of said transverse slides 18 and 23 toward each other, thus gripping the front and rear parts of the folded box-strip 71 tightly between said plates 17 and 24 and the adjacent plate-projection extensions 9 9. Continued downward movement of the said sliding bar 40 brings the beveled lower edges 39 39 of the side flanges 38 38 of the bar 40 down on the rear ends 15 15 of the folding-flap rods 14 14 and axially turning said rods, which brings their flaps 13 13 from horizontal to vertical position, carrying with them the lower horizontal parts of the strip 70 up into the vertical position shown in dotted lines in Fig. 8 tightly against the sides or ends of the folded strip 71, with the extreme ends of said strip 70 above and over the top edges of the strip 71, as also shown in dotted lines in said Fig. 8. Continued downward movement of said bar 40 brings the plunger 60 down against the upper central horizontal part of the strip 70, carrying same and the inturned curved ends of the springs 10 10 down into the position shown in dotted lines in Fig. 9, and also bringing down the head 50, so that its side flanges 56 57 on each lower side edge thereof shall receive between them the described extreme bent ends of the strip 70 and fold same over and around the upper edges of the side or end parts of the strip 71, as shown in full lines in said Fig. 9. This completes the downward movement of the sliding bar 40, and foot-pressure being released from the tread 44 the said bar 40 is carried upward by the retraction of the stout spiral springs 48 48, which first releases the plunger from its position shown in dotted lines in Fig. 9 and allows it to be carried up by the action of the springs 10 10, also carrying up the upper central horizontal part of the strip 70 until both are in the position shown in full lines in said Fig. 9, with the upper outer side edges of the said strip 70 bearing against the folded-in extreme ends of said strip, completing the box without the use of nails or any extraneous fastening. Continued upward movement of the sliding bar 40 causes the cross-piece 55 to contact with the rear lug 53 of the head 50, carrying the same upward to its normal original position, the side flanges 38 38 of the bar 40 being thereby carried above and released from contact with the ends 15 15 of the folding-flap axial rods 14 14, and the flaps 13 13 on said rods will drop by gravity back into their former horizontal position, and the said upward movement of said bar 40 also carries the outwardly-bent portions of the vertical spring 42 42 and 43 43 above the recessed ends of the slides 18 and 23, whereupon the spring 27, connecting the projecting parts 22 and 25 on said slides, will draw said parts together, thereby forcing the front upright plate 17 forward and the rear plate 24 back, thereby releasing the grip of said plates on the box, and the spring-tongue 72, if employed, is thrown back away from the box, which can now be lifted off the springs 10 10, leaving the machine ready for another operation.

As already stated, the machine is adapted for the manufacture of boxes of different heights and sizes—for example, as shown it is supposed to be for the manufacture of the quart size of box. To fit it for making the pint size, merely less height of the box is required, and for this size the strip 70 will be of less length and would be scored, indented, or otherwise treated for folding at different distances apart from those required for the quart box, and the strip 71 would be of less width. For the pint size the springs 10 10 would be removed by loosening the set-screws 33 33 and springs of less height substituted, and the set-screws 32 32 would be also loosened and the angle-plates 30 30 moved nearer the center of the base-plate 4 until the extreme bent ends of the strip 70 come in contact, as before, with the vertical flanges of said angle-plates, and the bolt 66 would be removed and the back plate 64 removed and reversed before being again tightened to place, so as to allow the sliding bar 40 to descend an increased distance before its flange-shoulders 69 met the upper edge of said plate 64, as already explained, because the lower the box the smaller its capacity; but no other alteration would be required in such change from quart sizes to pint sizes. If it was desired to make boxes of different shapes or with flaring instead of vertical sides, it would be necessary to substitute an appropriate base-plate with properly-shaped projections and attachments thereon, but without other change or any variation from the principle of operation of the machine, changes such as are above indicated being matters of skill within the province of the mechanic and not affecting the spirit of the invention.

Having thus described my invention, what I claim as new, and desire to secure by Letters Patent, is—

1. In a box-making machine, the combination with a suitable standard, of a base-plate supported thereon; uprights rising above said base-plate, and formed with vertical guideways; a spring-retracted slotted sliding bar movable in said guideways and extending below said base-plate; a head formed with folding flanges, and having movement in said uprights independent of the movement of said sliding bar, and provided with a lug in engagement with the slot in said sliding bar for movement therewith at predetermined times; a plunger carried by said head, and having vertical movement independent thereof; box-supporting springs on said base-plate beneath and in line with said plunger; projections on said base-plate for supporting the parts of which the box is formed; and means actuated by said sliding bar for gripping said box parts and for moving them into position to be operated upon.

2. In a box-making machine, the combination with a suitable standard, of a base-plate supported thereon; uprights rising above said base-plate, and formed with series of vertical guideways in their opposed inner faces; a spring-retracted sliding bar formed with side flanges having vertical movement in the rear guideways of the uprights, said sliding bar being formed with central vertical slots, separated by a cross-piece; a longitudinally-slotted head formed with folding flanges at each side of its under face, and having vertical movement in the front guideways of the uprights, and a rear lug projecting into the upper slot of the sliding bar; a pair of slides, located one above the other, and having movement transversely across the base-plate, the rear ends of said slides being recessed and projecting within the lower slot of the sliding bar; projections rising from the center of said base-plate for supporting the parts of which the box is formed; plates secured to the forward ends of said transverse slides in lines parallel with the rear and front projections on said base-plate; a retracting-spring connecting the two slides; vertical outwardly-bent springs secured to said sliding bar on each side of the lower slot therein, in engagement with the recessed ends of said transverse slides; folding flaps arranged in lines parallel with the side projections on the base-plate, and mounted on axial rods having rear ends projecting in the path of the side flanges of the sliding bar; a plunger carried by said head, and having a shank extending through the slot therein, for movement independent of said head; and box-supporting springs on said base-plate beneath and in line with said plunger.

3. In a box-making machine, the combination with a suitable standard, of a base-plate supported thereon; uprights rising above said base-plate, and formed with vertical guideways; a spring-retracted sliding bar movable in said guideways, and extending below said base-plate, and formed with rear vertical flanges, having shouldered extensions at their upper ends; a head formed with folding flanges, and having movement in said uprights both independent of, and in connection with, said sliding bar, at predetermined times; a reversible plate, adjustably connected to the upper ends of said uprights, in the path of the said shouldered extensions; a plunger carried by said head, and having vertical movement independently thereof; box-supporting springs removably supported on said base-plate beneath and in line with said plunger; projections on said base-plate surrounding said springs for supporting the parts of which the box is formed; slotted angle-plates adjustably secured to said base-plate on each side of the center thereof; and means actuated by said sliding bar for gripping said box parts and for moving them into position to be operated upon.

4. In a box-making machine, the combination with a suitable standard, of a base-plate supported thereon, and carrying means for supporting the parts of which the box is to be formed and for gripping same and for moving them into position to be operated upon; uprights rising above said base-plate, and formed with two pairs of opposed vertical guideways; a spring-retracted sliding bar having movement in one pair of said guideways; an edge-folding head having movement in the other pair of said guideways; an independently-movable plunger carried by said head; and box-supporting springs on said base-plate beneath and in line with said plunger.

In testimony that I claim the foregoing I have hereunto set my hand, at Milwaukee, in the county of Milwaukee and State of Wisconsin, in the presence of two witnesses.

FRANK M. WADE.

Witnesses:
H. G. UNDERWOOD,
E. W. HELLER.